United States Patent
Yamada et al.

(10) Patent No.: US 10,160,181 B2
(45) Date of Patent: Dec. 25, 2018

(54) LAMINATED STRUCTURE

(71) Applicant: TOYOTA BOSHOKU KABUSHIKI KAISHA, Aichi-ken (JP)

(72) Inventors: Yuji Yamada, Aichi-ken (JP); Yoko Murayama, Aichi-ken (JP); Mitsuo Kobayashi, Aichi-ken (JP); Masatoshi Kani, Gifu-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 39 days.

(21) Appl. No.: 15/363,144

(22) Filed: Nov. 29, 2016

(65) Prior Publication Data
US 2017/0157887 A1    Jun. 8, 2017

(30) Foreign Application Priority Data

Dec. 2, 2015   (JP) .................. 2015-235405

(51) Int. Cl.
*B60N 2/58*   (2006.01)
*B32B 3/30*   (2006.01)
(Continued)

(52) U.S. Cl.
CPC .................. *B32B 3/30* (2013.01); *B32B 3/06* (2013.01); *B32B 5/022* (2013.01); *B32B 5/024* (2013.01); *B32B 5/026* (2013.01); *B32B 5/18* (2013.01); *B32B 5/245* (2013.01); *B32B 7/04* (2013.01); *B32B 7/12* (2013.01); *B32B 9/025* (2013.01); *B32B 9/045* (2013.01); *B32B 9/046* (2013.01); *B32B 27/12* (2013.01); *B32B 2250/03* (2013.01); *B32B 2262/0276* (2013.01); *B32B 2266/0278* (2013.01); *B32B 2307/51* (2013.01); *B32B 2307/544* (2013.01); *B32B 2307/546* (2013.01); *B32B 2307/558* (2013.01);
(Continued)

(58) Field of Classification Search
CPC ..... Y10T 428/24033; Y10T 428/24479; Y10T 428/24529; Y10T 428/24537; Y10T 428/24612; Y10T 428/2462; Y10T 428/24496–428/24512; Y10T 428/24744; B60N 2/5883
See application file for complete search history.

(56) References Cited

U.S. PATENT DOCUMENTS 4,563,785 A * 1/1986 Samelson .............. A47C 27/14
                                                                5/472

FOREIGN PATENT DOCUMENTS

JP          2015-143067          8/2015

* cited by examiner

*Primary Examiner* — Alexander S Thomas
(74) *Attorney, Agent, or Firm* — Greenblum & Bernstein, P.L.C.

(57) ABSTRACT

A laminated structure includes a surface sheet material, and a backing material joined to a back surface of the surface sheet material. The surface sheet material has seams where the surface sheet material is sewn to another piece. The seams are provided in two positions that are adjacent to each other in an in-plane direction of the surface sheet material. The surface sheet material includes a backside uneven portion with a protrusion. The backside uneven portion is provided on a portion of the back surface within a region between the seams. The backing material is joined to the back surface of the surface sheet material such that the backing material is in surface contact with the back surface of the surface sheet material and the backing material conforms to the backside uneven portion.

6 Claims, 3 Drawing Sheets

(51) Int. Cl.
*B32B 3/06* (2006.01)
*B32B 5/24* (2006.01)
*B32B 5/02* (2006.01)
*B32B 5/18* (2006.01)
*B32B 7/04* (2006.01)
*B32B 7/12* (2006.01)
*B32B 9/02* (2006.01)
*B32B 9/04* (2006.01)
*B32B 27/12* (2006.01)

(52) U.S. Cl.
CPC ..... *B32B 2479/00* (2013.01); *B32B 2605/003* (2013.01); *Y10T 428/24033* (2015.01); *Y10T 428/24504* (2015.01); *Y10T 428/24612* (2015.01)

LAMINATED STRUCTURE

INCORPORATION BY REFERENCE

The disclosure of Japanese Patent Application No. 2015-235405 filed on Dec. 2, 2015, including the specification, drawings and abstract is incorporated herein by reference in its entirety.

BACKGROUND

1. Technical Field

The present disclosure relates generally to a laminated structure, and relates more specifically to a laminated structure in which a backing material is joined to a back surface of a surface sheet material.

2. Description of Related Art

As related art, Japanese Patent Application Publication No. 2015-143067 (JP 2015-143067 A) describes a vehicle seat having a configuration in which a backing material, such as a cover pad, is integrally joined and laminated onto a back surface of a surface sheet material.

SUMMARY

In the related art described above, the back surface of the surface sheet material is pulled in toward the back side in places, and thus the back surface of the surface sheet material has an uneven shape with protrusions and recesses. However, a region of the back surface between edge portions, at which the back surface is pulled in toward the back side, has a flat planar shape. Therefore, when the region between the edge portions is narrow, the area of contact between the back surface of the surface sheet material and the backing material joined to the back surface may not be sufficiently wide. In view of this, the present disclosure provides a laminated structure configured to ensure a sufficiently wide joining area at which a surface sheet material and a backing material are joined together.

One aspect of the present disclosure relates to a laminated structure including a surface sheet material, and a backing material joined to a back surface of the surface sheet material. The surface sheet material has seams where the surface sheet material is sewn to another piece. The seams are provided in two positions that are adjacent to each other in an in-plane direction of the surface sheet material. The surface sheet material includes a backside uneven portion with a protrusion. The backside uneven portion is provided on a portion of the back surface within a region between the seams. The backing material is joined to the back surface of the surface sheet material such that the backing material is in surface contact with the back surface of the surface sheet material and the backing material conforms to the backside uneven portion.

According to the above aspect, the backside uneven portion is provided on the back surface of the surface sheet material to be joined to the backing material. Thus, it is possible to ensure a wide joining area at which the backing material is joined to the surface sheet material.

In the aspect described above, the backside uneven portion may have a configuration in which a hollow portion formed in the surface sheet material is filled with a core.

With this configuration, the backside uneven portion is formed in a shape that is easily and appropriately maintained.

In the aspect described above, the hollow portion may be a hollow weave portion formed in the surface sheet material.

With this configuration, the hollow portion is easily formed in the surface sheet material without using an additional material.

In the aspect described above, the core may be made of yarns used to constitute the surface sheet material.

With this configuration, the core is easily formed within the surface sheet material without using an additional material.

In the aspect described above, the backside uneven portion may include a plurality of protrusions arranged next to each other, and the protrusions may be connected to each other via a flat connecting portion.

With this configuration in which the protrusions are connected to each other via the flat connecting portion, the width of each portion between the protrusions of the back surface of the surface sheet material, to which the backing material is to be conformed, is made wide, so that the backing material is joined to the back surface of the surface sheet material more appropriately.

In the aspect described above, a front side uneven portion may be formed within a front region of a front surface of the surface sheet material, the front region corresponding to the region where the backside uneven portion is formed, and the front side uneven portion on the front surface of the surface sheet material may be symmetric, in protruding-and-recessing shape, with the backside uneven portion on the back surface of the surface sheet material.

With this configuration, the front side uneven portion is efficiently formed together with the backside uneven portion.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, example embodiments of the present disclosure will be described with reference to the accompanying drawings.

Figure 1:
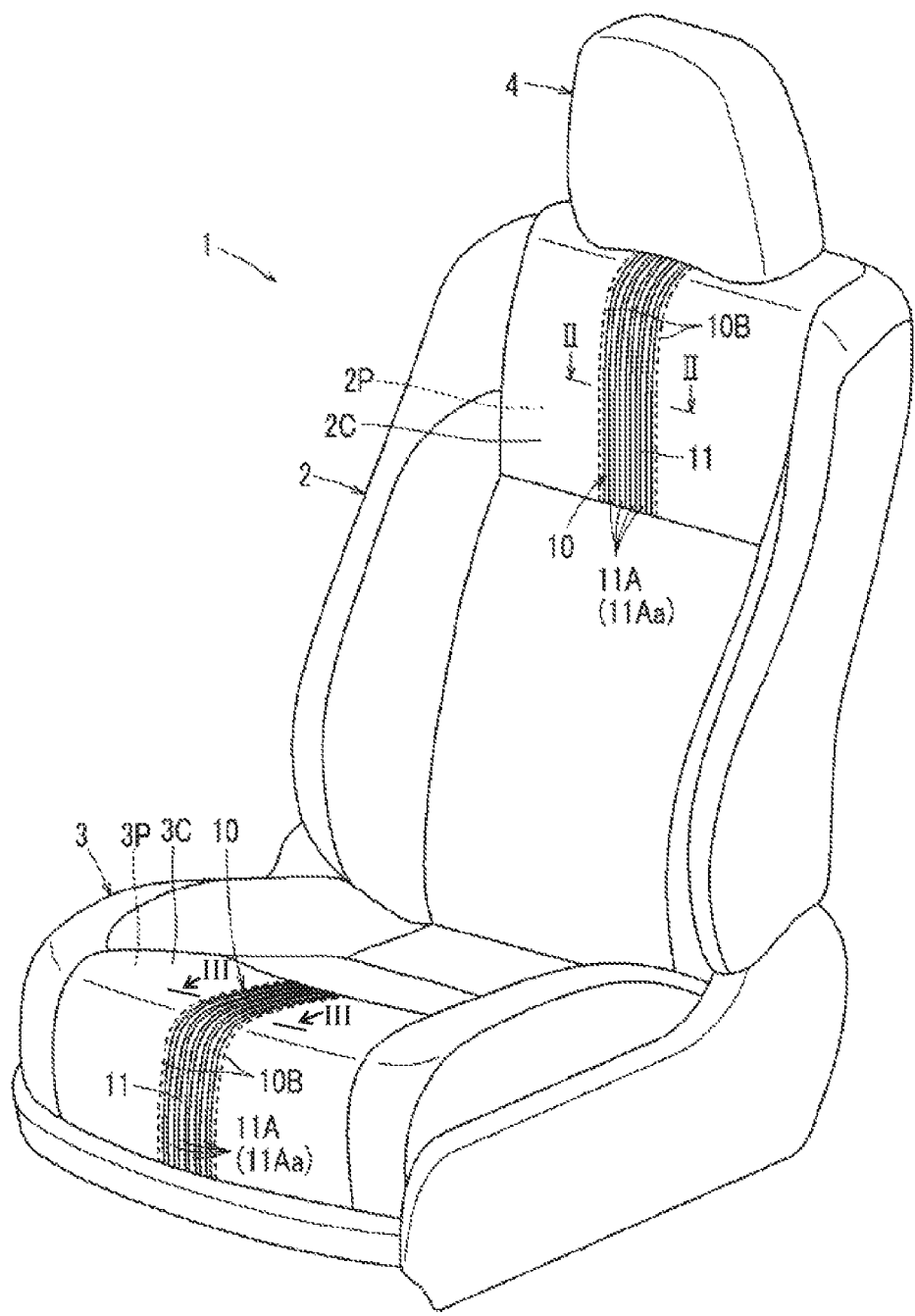
FIG. 1 is a perspective view schematically illustrating the configuration of a vehicle seat including a laminated structure according to a first example embodiment.

First, the configuration of a seat 1 including a laminated structure (e.g., ribbon tape 10) according to a first example embodiment will be described with reference to FIG. 1 and FIG. 2. The seat 1 of the first example embodiment is configured as a left seat of an automobile, as illustrated in FIG. 1. The seat 1 includes a seatback 2 that serves as a backrest for a seated occupant, a seat cushion 3 that serves as a seating portion for the seated occupant, and a headrest 4 that serves as a headrest for the seated occupant.

The basic configuration of the seatback 2 includes a back frame made of metal (not illustrated), a back pad 2P made of urethane foam, and a back cover 2C in the form of a sheet. The back frame constitutes the internal frame of the seatback 2. The back pad 2P is assembled to a front portion of the back frame, and elastically receives a body pressure from a seated occupant. The back cover 2C is fitted over the back pad 2P so as to cover the entire surface of the back pad 2P. The basic configuration of the seat cushion 3 includes a cushion frame made of metal (not illustrated), a cushion pad 3P made of urethane foam, and a cushion cover 3C in the form of a sheet. The cushion frame constitutes the internal frame of the seat cushion 3. The cushion pad 3P is assembled to an upper portion of the cushion frame, and elastically receives a body pressure from the seated occupant. The cushion cover 3C is fitted over the cushion pad 3P so as to cover the entire surface of the cushion pad 3P.

A ribbon tape 10 in the form of a strip is provided in a center portion of the back cover 2C in its width direction, in order to partially decorate an upper half region of the center portion of the back cover 2C. The ribbon tape. 10 is in the form of a strip extending in the height direction of the seatback 2. As illustrated in FIG. 2, a cover piece of the back cover 2C, which is held taut over the surface of a main portion of the seatback 2, includes a right cover piece and a left cover piece. The ribbon tape 10 is sewn to the right cover piece and the left cover piece so as to extend between the right cover piece and the left cover piece. The ribbon tape 10 is an example of "laminated structure" of the present disclosure. The right cover piece and the left cover piece of the back cover 2C, which are respectively sewn to a right end portion and a left end portion of the ribbon tape 10, are each an example of "another piece" of the present disclosure.

As illustrated in FIG. 1, a ribbon tape 10 in the form of a strip is provided in a center portion of the cushion cover 3C in its width direction, in order to partially decorate a front half region of the center portion of the cushion cover 3C. The ribbon tape 10 is in the form of a strip extending in the front-rear direction of the seat cushion 3. As illustrated in FIG. 2, a cover piece of the cushion cover 3C, which is held taut over the surface of a main portion of the seat cushion 3, includes a right cover piece and a left cover piece. The ribbon tape 10 is sewn to the right cover piece and the left cover piece so as to extend between the right cover-piece and the left cover piece. The ribbon tape 10 is an example of "laminated structure" of the present disclosure. The right cover piece and the left cover piece of the cushion cover 3C, which are respectively sewn to a right end portion and a left end portion of the ribbon tape 10, are each an example of "another piece" of the present disclosure.

Figure 2:
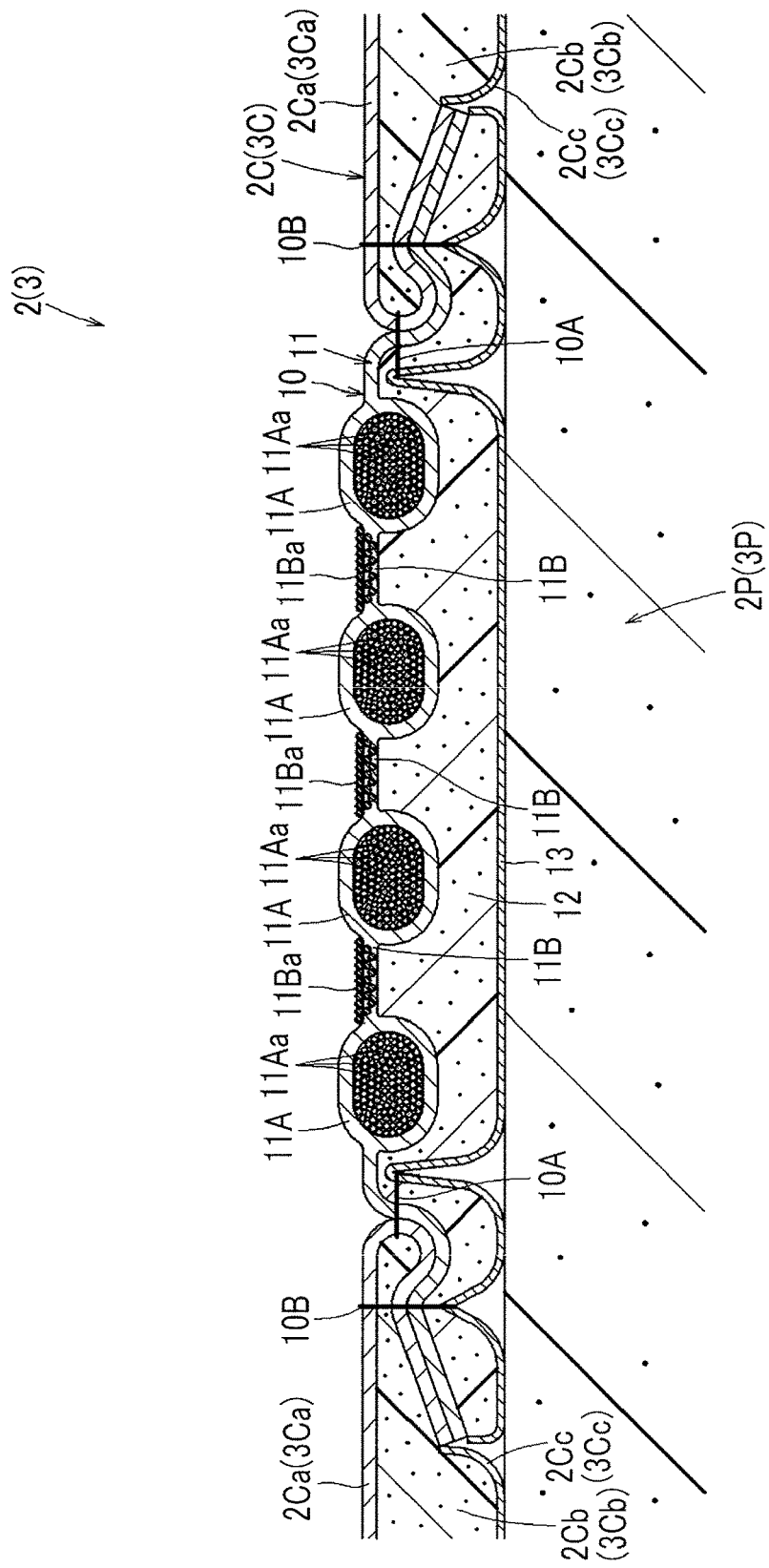
FIG. 2 is a sectional view taken along lines II-II and III-III in FIG. 1.

FIG. 2 illustrates the transverse sectional shape of a portion of the seatback 2, where the ribbon tape 10 is provided. The basic configuration of the transverse section is substantially the same as the basic configuration of the transverse section of a portion of the seat cushion 3, where the ribbon tape 10 is provided. Therefore, in FIG. 2 illustrating the configurations of various portions of the seatback 2, the configurations of various portions of the seat cushion 3 are also schematically illustrated by providing parenthesized reference symbols denoting the configurations of the portions of the seat cushion 3 next to the reference symbols denoting the configurations of the corresponding portions of the seatback 2. The basic configuration of the ribbon. tape 10 provided in the seatback 2 and the basic configuration of the ribbon tape 10 provided in the seat cushion 3 are substantially the same. Therefore these configurations will be collectively described by describing the configuration of the ribbon tape 10 provided in the seatback 2.

The back cover 2C has a three-layer structure including a surface sheet material 2Ca made of fabric, a laminated pad 2Cb made of urethane foam, and a back base cloth 2Cc. The laminated pad 2Cb is laminated and bonded to the back surface of the surface sheet material 2Ca. The back base cloth 2Cc is laminated and bonded to the back surface of the laminated pad 2Cb. The back cover 2C is formed by connecting together a plurality of cover pieces, each having the above-described three-layer structure, into a form of a single bag with which the entire surface of the back pad 2P is covered. The back cover 2C is held taut so as to be in close contact with the entire surface of the back pad 2P such that the area of contact between the back cover 2C and the back pad 2P is kept wide.

Similarly, the cushion cover 3C has a three-layer structure including a surface sheet material 3Ca made of fabric, a laminated pad 3Cb made of urethane foam, and a back base cloth 3Cc. The laminated pad 3Ch is laminated and bonded to the back surface of the surface sheet material 3Ca. The back base cloth 3Cc is laminated and bonded to the back surface of the laminated pad 3Cb. The cushion cover 3C is formed by connecting together a plurality of cover pieces, each having the above-described three-layer structure, into a form of a single bag with which the entire surface of the cushion pad 3P is covered. The cushion cover 3C is held taut so as to be in close contact with the entire surface of the cushion pad 3P such that the area of contact between the cushion cover 3C and the cushion pad 3P is kept wide.

The ribbon tape 10 has a similar configuration as that of each of the back cover 2C and the cushion cover 3C. Specifically, the ribbon tape 10 has a three-layer structure including a surface sheet material 11 in the form of a strip, a laminated pad 12 made of urethane foam, and a back base cloth 13. The surface sheet material 11 is woven with a needle loom. The laminated pad 12 is laminated and bonded to the back surface of the surface sheet material 11. The back base cloth 13 is laminated and bonded to the back surface of the laminated pad 12. The surface sheet material 11 is an example of "surface sheet material" of the present disclosure. The laminated pad 12 is an example of "backing material" of the present disclosure.

The surface sheet material 11 has hollow weave portions 11A arranged at equal intervals in its strip-width direction (i.e., the seat width direction). The hollow weave portions 11A are arranged in four locations other than both ends of the surface sheet material 11 in its strip-width direction. Each hollow weave portion 11A is formed through a hollow weave, and has a generally round and hollow transverse section. In the course of weaving the surface sheet material 11, part of the surface sheet material 11 is formed through hollow weave. In this way, the hollow weave portions 11A are formed so as to be integrally woven into the surface sheet material 11. Thus, the hollow weave portions 11A are smoothly and continuously integrated into the surface sheet material 11. Each hollow weave portion 11A extends straight in the strip-length direction of the surface sheet material 11, and has a transverse sectional shape that is uniform in the strip-length direction.

A core 11Aa is provided inside each hollow weave portion 11A. The core 11Aa is formed of a plurality of warp yarns interwoven in the strip-length direction in the course of forming the hollow weave portions 11A through hollow weave. The warp yarns are stuffed into the hollow weave portions 11A without being interlaced with weft yarns. The cores 11Aa are formed of the interwoven warp yarns that are tightly stuffed into the hollow weave portions 11A without being interlaced with weft yarns. Thus, the cores 11Aa are provided in such a manner that the warp yarns are able to appropriately exert a resilient force without receiving a binding force that would be generated if the warp yarns are interlaced with weft yarns inside the hollow weave portions 11A.

With the configuration described above, the hollow weave portions 11A are elastically supported from the inside by the cores 11Aa, and are thus able to bear a pressing force, such as a seating pressure from a seated occupant, with a strong resilient force. The resilient force exerted by the hollow weave portions 11A is a resilient force exerted by the cores 11Aa formed of a plurality of warp yarns that are stuffed inside the hollow weave portion 11A without being interlaced with weft yarns. Therefore, the resilient force exerted by the hollow weave portions 11A is a resilient force that gives a seated occupant an appropriate and comfortable cushion feeling instead of giving the seated occupant a feeling of a hard foreign body. Specifically, the surface sheet material 11 is woven from polyester-fiber multifilament yarns. The hollow weave portions 11A and the cores 11Aa stuffed inside the hollow weave portions 11A are also woven from polyester-fiber multifilament yarns.

Each hollow weave portion 11A of the surface sheet material 11 is formed such that, in its transverse section, an upper-half semicircular portion of the generally round and hollow transverse section protrudes upward on the front surface of the surface sheet material 11. Further, each hollow weave portion 11A of the surface sheet material 11 is formed such that, in its transverse section, a lower-half semicircular portion of the generally round and hollow transverse section protrudes downward on the back surface of the surface sheet material 11. Further, the hollow weave portions 11A are not arranged so as to be continuously connected together in the strip-width direction of the surface sheet material 11, but the hollow weave portions 11A are arranged in the strip-width direction so as to be intermittently connected to each other with the flat connecting portions 11B, which are flush with a reference surface of the surface sheet material 11, interposed between the hollow weave portions 11A.

Decorative layer portions 11Ba in the form of a sheet are integrally laminated onto the front surfaces of the connecting portions 11B. The decorative layer portions 11Ba are formed of interwoven polyester-fiber monofilament yarns that are different from the yarns constituting the surface sheet material 11. In the course of weaving the connecting portions 11B, the yarns (i.e., monofilament yarns) constituting the decorative layer portions 11Ba are interlaced with the yarns (i.e., multifilament yarns) constituting the connecting portions 11B. Thus, the decorative layer portions 11Ba are formed so as to be integrally joined to the connecting portions 11B. The yarns constituting the decorative layer portions 11Ba are made of yarn material having a color different from that of the yarns constituting the connecting portions 11B. Each of the yarns (i.e., monofilament yarns) constituting the decorative layer portions 11Ba has a diameter greater than that of each of the yarns (i.e., multifilament yarns) constituting the connecting portions 11B.

As a result, on the front surface of the surface sheet material 11, the hollow weave portions 11A and the decorative layer portions 11Ba, which differs from the hollow weave portions 11A in shape and color, are alternately arranged with attractive appearance. The hollow weave portions 11A protrude on the front surface of the surface sheet material 11. The connecting portions 11B are disposed between the hollow weave portions 11A. On the back surface of the surface sheet material 11, the hollow weave portions 11A, which protrude on the back surface of the surface sheet material 11, are arranged with the flat connecting portions 11B interposed between the hollow weave portions 11A.

The laminated pad 12 is bonded to the surface sheet material 11 having the above-described configuration, by laminating the laminated pad 12 onto the back surface of the surface sheet material 11 such that the laminated pad 12 is in surface contact with the back surface of the surface sheet material 11. At this time, the laminated pad 12 is strongly bonded to the back surface of the surface sheet material 11. This is because the area of contact between the surface sheet material 11 and the laminated pad 12 is made wide due to protrusions and recesses of the back surface of the surface sheet material 11, which are formed due to the hollow weave portions 11A that protrude on the back surface of the surface sheet material 11. The flat connecting portions 11B are interposed between the hollow weave portions 11A. Thus, the protrusions and recesses of the back surface of the surface sheet material 11 are configured such that the bottom width (the width in the strip-width direction) of each of the recesses between the hollow weave portions 11A is made wide, and the shape of each recess is not sharply tapered.

As a result, the laminated pad 12 to be bonded to the back surface of the surface sheet material 11 fits into the recesses each having a wide bottom width over a wide area between the hollow weave portions 11A while gently deforming, instead of fitting into the recesses in such a manner that part of the laminated pad 12 is pushed, in a sharply tapered shape, into the recesses. Thus, the laminated pad 12 is integrally bonded to the back surface of the surface sheet material 11 such that the laminated pad 12 is in surface contact with the back surface of the surface sheet material 11 over the entire region. This is because the laminated pad 12 fits snugly into the recesses each having a wide bottom width between the hollow weave portions 11A. In other words, the laminated pad 12 is prevented from floating off of the back surface of the surface sheet material 11 due to an excessive repelling force (resilient force) which would be exerted if the laminated pad 12 is forcibly pushed into the recesses between the hollow weave portions 11A.

The ribbon tape 10 is joined to the cover pieces of the back cover 2C (cushion cover 3C) that are disposed adjacent to the ribbon tape 10 in its width direction, when edge portions of the ribbon tape 10 are sewn to edge portions of the cover pieces in the following manner. That is, the edge portions of the ribbon tape 10 in its strip-width direction (i.e., in the seat width direction), that is, the edge portions of the ribbon tape 10 that are outside the region where the hollow weave portions 11A are formed, are sewn to the corresponding edge portions of the cover pieces of the back cover 2C (cushion cover 3C), by inside stitches 10A provided along the edge portions, with seam allowances of the ribbon tape 10 and the cover pieces placed together and folded back toward the back side.

Moreover, the overlapped seam allowances of the edge portions of the ribbon tape 10 and the cover pieces of the back cover 2C (cushion cover 3C) that are sewn together are folded back so as to overlap with the back surface side of the back cover 2C (cushion cover 3C), and are sewn to the edge portions of the back cover 2C (cushion cover 3C) by outside stitches 10B provided along the inside stitches 10A. Each of the inside stitches 10A is an example of "seam" of the present disclosure. In addition, each of the outside stitches 10B is also included in the concept of the "seam" of the present disclosure.

The ribbon tape 10 having the above-described configuration transmits, while widely dispersing, a body pressure from a seated occupant to the back pad 2P (cushion pad 3P), due to the three-layer cushioning structure of a composite body including the surface sheet material 11, the laminated pad 12, and the back base cloth 13. As a result, the ribbon tape 10 is able to exhibit high cushioning performance. In addition, the ribbon tape 10 includes the connecting portions 11B having bending rigidity and torsional rigidity that are increased due to the decorative layer portions 11Ba that are laminated onto the connecting portions 11B. As a result, the connecting portions 11B are inhibited from being deformed. Specifically, the connecting portions 11B are inhibited from bending in a valley shape due to an action of a resilient force exerted by the bulging shape of the hollow weave portions 11A, or inhibited from being twisted due to various factors.

In summary, the ribbon tape 10 (laminated structure) of the present example embodiment has the following configuration. That is, the ribbon tape 10 is a laminated structure (the ribbon tape 10) in which a backing material (the laminated pad 12) is joined to the back surface of the surface sheet material 11. The surface sheet material 11 has seams (the inside stitches 10A) where the surface sheet material 11 is sewn to another piece (a cover piece of the back cover 2C or a cover piece of the cushion cover 3C), and the seams are provided in two positions that are adjacent to each other in the in-plane direction of the surface sheet material 11. Further, the surface sheet material 11 has a backside uneven portion with protrusions and recesses (the protrusions of the backside of the hollow weave portions 11A). The backside uneven portion is provided within a region between the seams (the inside stitches 10A) of the back surface of the surface sheet material 11. The backing material (the laminated pad 12) is joined to the back surface of the surface sheet material 11 such that the backing material (the laminated pad 12) is in surface contact with the back surface of the surface sheet material 11 and conforms to the protrusions and recesses of the backside uneven portion (the protrusions of the backside of the hollow weave portions 11A).

As described above, the backside uneven portion (the protrusions of the backside of the hollow weave portions 11A) is provided on the back surface of the surface sheet material 11 to be joined to the backing material (the laminated pad 12). Thus, it is possible to ensure a wide joining area at which the backing material (the laminated pad 12) is joined to the surface sheet material 11.

Further, the backside uneven portion (the protrusions of the backside of the hollow weave portions 11A) has a configuration in which hollow portions (the hollow weave portions 11A) formed in the surface sheet material 11 are filled with the cores 11Aa. With this configuration, the backside uneven portion (the protrusions of the backside of the hollow weave portions 11A) is formed in a shape that is easily and appropriately maintained.

Further, the hollow portions are the hollow weave portions 11A formed in the surface sheet material 11. With this configuration, the hollow portions (the hollow weave portions 11A) are easily formed in the surface sheet material 11 without using an additional material.

Further, the cores 11Aa are made of yarns (warp yarns) that are used to weave the surface sheet material 11. With this configuration, the cores 11Aa are easily formed inside the surface sheet material 11 without using an additional material.

Further, the backside uneven portion (the protrusions of the backside of the hollow weave portions 11A) has such a shape that protrusions and recesses are alternately arranged, and the protrusions are connected to each other via the flat connecting portions 11B. With this configuration, the width of each portion of the back surface of the surface sheet material 11, to which the backing material (the laminated pad 12) is to be conformed, is made wide, so that the backing material (the laminated pad 12) is joined to the back surface of the surface sheet material 11 more appropriately.

A front side uneven portion (the protrusions of the front side of the hollow weave portions 11A) is formed within a front region of the front surface of the surface sheet material 11, which corresponds to the region where the backside uneven portion (the protrusions of the backside of the hollow weave portions 11A) is formed. The front side uneven portion on the front surface of the surface sheet material may be symmetric, in protruding-and-recessing shape, with the backside uneven portion (the protrusions of the backside of the hollow weave portions 11A) on the back surface of the surface sheet material 11. With this configuration, the front side uneven portion is efficiently formed together with the backside uneven portion (the protrusions of the backside of the hollow weave portions 11A).

Heretofore, one example embodiment of the present disclosure has been described, but the present disclosure may also be carried out in a variety of other modes aside from the example embodiment described above. For example, the configuration of the laminated structure of the present disclosure may also be applied to seats for various kinds of transportation means, such as aircraft, marine vessels, and vehicles other than automobiles, such as railcars, in addition to being applied to seats for automobiles. Further, the configuration of the laminated structure of the present disclosure may also be applied to other seat structures, such as headrests and ottomans, in addition to being applied to seatbacks and seat cushions of the various kinds of vehicle seats described above. Further, the configuration of the laminated structure of the present disclosure may also be applied to various furnishings, such as trim covers for a variety of vehicle interior trims, and covers for furniture, such as sofas and beds, in addition to being applied to vehicle seats.

The surface sheet material may be made of other fabric materials than woven fabric, such as non-woven fabric and knit fabric, and may be made of a sheet-like material other than a fabric material, such as a leather material. The backing material to be joined to the back surface of the surface sheet material may be a seat pad, such as a seatback pad or a cushion pad, in addition to being applied to the laminated pad described in the foregoing embodiment. Further, the backing material is not limited to a flexible material, such as the pad material, and may also be made of an inflexible material, such as a resin material or a panel material. The backing material may be joined to the back surface of the surface sheet material by a variety of methods other than bonding performed through, for example, lamination. That is, the backing material may be joined to the back surface of the surface sheet material by the application of an adhesive, or by integral molding performed through, for example, injection molding.

The shape of the reference surface of the surface sheet material is not limited to a flat planar shape. The reference surface of the surface sheet material may be entirely or partially curved. The backside uneven portion need not be formed of hollow weave portions formed by subjecting a portion of the surface sheet material to hollow woven. The backside uneven portion may be in an uneven shape obtained by forming the surface sheet material in a bellows shape, or may be formed by adding or integrally forming a member or members that form protruding portions on the back surface of the surface sheet material. Alternatively, the backside uneven portion may be formed by fitting additional hollow members to the surface sheet material.

Figure 3:
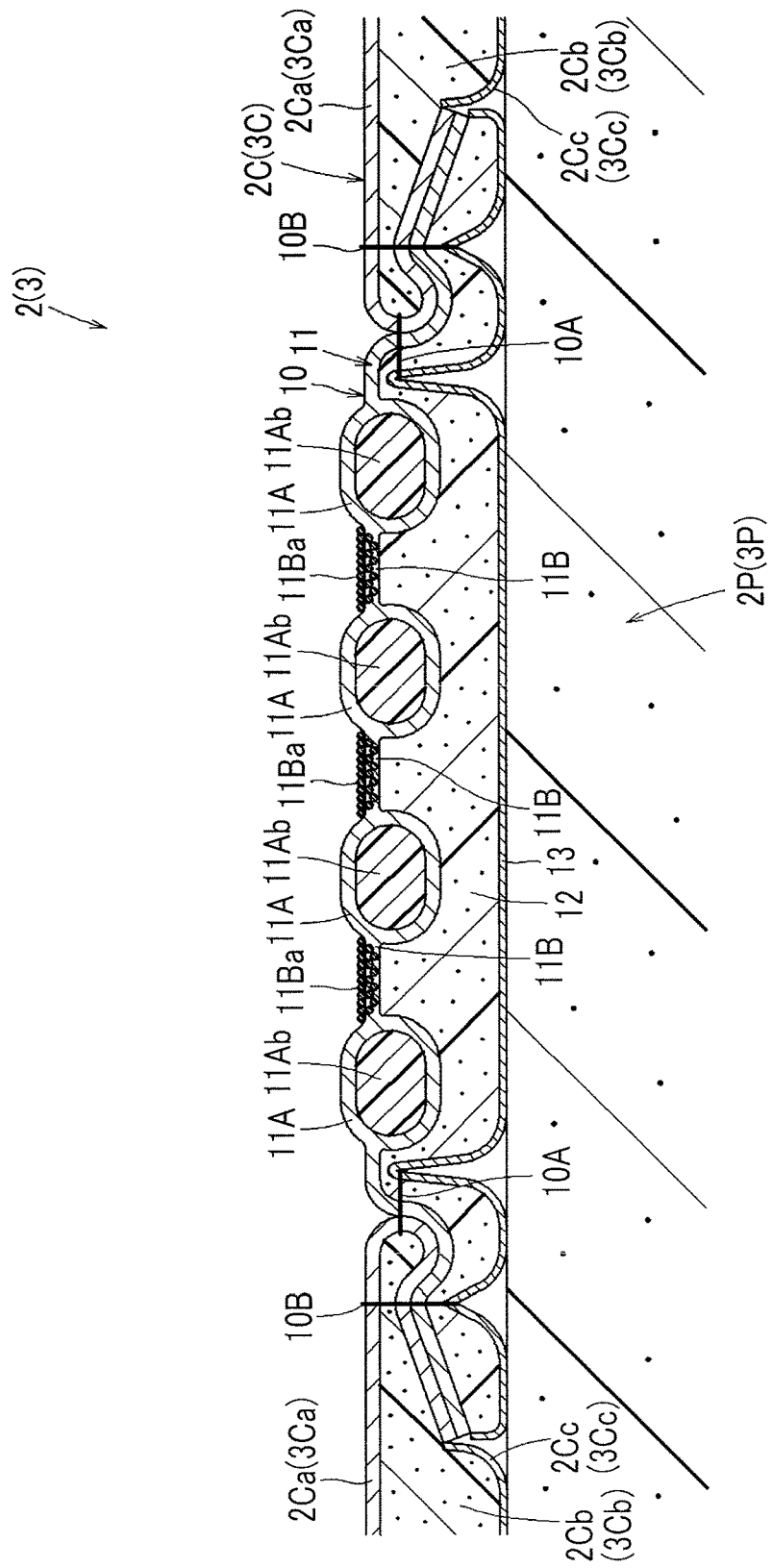
FIG. 3 is a sectional view schematically illustrating the configuration of a vehicle seat including a laminated structure according to a second example embodiment, FIG. 3 corresponding to FIG. 2.

The cores stuffed inside the hollow portions formed of the hollow weave portions or formed by fitting additional hollow members to the surface sheet material need not be made of the yarns used to constitute the surface sheet material. That is, the cores stuffed inside the hollow portions may have any one of a variety of structures. For example, resin cores 11Ab may be inserted into the hollow portions, as illustrated in FIG. 3, or a pad material or a resin material may be provided inside the hollow portions through insert-molding, or hollow weave portions may be woven into a solid shape. The cores may be formed integrally bonded to the hollow portions, or simply inserted into the hollow portions. The cores may be intermittently provided inside the hollow portions. The transverse sectional shape of each hollow portion may be a polygonal shape, such as a rectangular shape, aside from a round shape or an elliptical (including oval) shape. Alternatively, the transverse sectional shape of each hollow portion may be a shape different from those described above. The shape of each core filled inside the hollow portion may also be a polygonal shape, such as a rectangular shape, aside from a round shape or an elliptical (including oval) shape. Alternatively, the shape of each core filled inside the hollow portion may be a shape different from those described above.

The hollow portions formed of the hollow weave portions or formed by fitting additional hollow members to the surface sheet material need not be a plurality of portions being provided so as to be arranged and connected together in a continuous manner in a specific in-plane direction. Alternatively, the hollow portion formed of the hollow weave portion or formed by fitting additional hollow member to the surface sheet material may be formed in one continuous long hollow shape. The shape of each hollow portion may be a shape other than a circular shape, such as a trapezoidal shape or a triangular shape. Further, the hollow portions need not extend in a striated pattern with a uniform transverse sectional shape, in a specific in-plane direction. That is, the hollow portions may have a transverse sectional shape that change in places, or the hollow portions may be provided in one location or in a plurality of locations in the in-plane direction, in various shapes such as a spherical shape, a spindle shape, and a column shape.

Moreover, examples of the seam of the surface sheet material where the surface sheet material is sewn to another piece include seams with a variety of other members that are sewn to the surface sheet material, such as a seam where the surface sheet material is sewn to a hanging cotton cloth or a pull-over resin hook provided for pulling the surface sheet material into the pad, a seam where the surface sheet material is sewn to piping, and a seam where the surface sheet material is sewn to a resin hook that hooks onto a fixed member such as a seat frame, aside from a seam where the surface sheet material is sewn to cover pieces that are adjacent in the in-plane direction. The laminated structure may be arranged in any of a variety of orientations, such as vertical, horizontal, or diagonal. Aside from being formed in a strip-shape, the laminated structure may also be formed in such a planar shape that the laminated structure extends also in the width direction. The laminated structure may be formed in a different shape in which a portion of the laminated structure is cut off.

What is claimed is:
1. A laminated structure comprising:
a surface sheet material; and
a backing material joined to a back surface of the surface sheet material, wherein
the surface sheet material has seams where the surface sheet material is sewn to another piece, the seams being provided in two positions that are adjacent to each other in an in-plane direction of the surface sheet material,
the surface sheet material includes a backside uneven portion with a protrusion, the backside uneven portion being provided on a portion of the back surface within a region between the seams,
the backing material is joined to the back surface of the surface sheet material such that the backing material is in surface contact with the back surface of the surface sheet material and the backing material conforms to the backside uneven portion, and
the backside uneven portion has a configuration in which a hollow portion formed in the surface sheet material is filled with a core.
2. The laminated structure according to claim 1, wherein the hollow portion is a hollow weave portion formed in the surface sheet material.
3. The laminated structure according to claim 1, wherein the core is made of yarns used to constitute the surface sheet material.
4. The laminated structure according to claim 1, wherein
a front side uneven portion is formed within a front region of a front surface of the surface sheet material, the front region corresponding to the region where the backside uneven portion is formed, and
the front side uneven portion on the front surface of the surface sheet material is symmetric, in protruding-and-recessing shape, with the backside uneven portion on the back surface of the surface sheet material.
5. The laminated structure according to claim 1, wherein the protrusion protrudes downward into the backing material.
6. A laminated structure comprising:
a surface sheet material; and
a backing material joined to a back surface of the surface sheet material, wherein
the surface sheet material has seams where the surface sheet material is sewn to another piece, the seams being provided in two positions that are adjacent to each other in an in-plane direction of the surface sheet material,
the surface sheet material includes a backside uneven portion with a protrusion, the backside uneven portion being provided on a portion of the back surface within a region between the seams,
the backing material is joined to the back surface of the surface sheet material such that the backing material is in surface contact with the back surface of the surface sheet material and the backing material conforms to the backside uneven portion,
the backside uneven portion includes a plurality of protrusions arranged next to each other, and
the protrusions are connected to each other via a flat connecting portion.

* * * * *